(12) United States Patent
Kitamura et al.

(10) Patent No.: US 7,207,179 B2
(45) Date of Patent: Apr. 24, 2007

(54) METHOD OF CONNECTING HEAT TRANSFER PIPE AND CAPILLARY TUBE

(75) Inventors: Yoshinori Kitamura, Sakai (JP); Nobuhiro Sahara, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 238 days.

(21) Appl. No.: 10/525,869

(22) PCT Filed: May 31, 2004

(86) PCT No.: PCT/JP2004/007489

§ 371 (c)(1), (2), (4) Date: Feb. 25, 2005

(87) PCT Pub. No.: WO2004/110666

PCT Pub. Date: Dec. 23, 2004

(65) Prior Publication Data

US 2006/0150669 A1     Jul. 13, 2006

(30) Foreign Application Priority Data

Jun. 16, 2003   (JP) .............................. 2003-170552

(51) Int. Cl.
*F25B 1/00*   (2006.01)

(52) U.S. Cl. .................. 62/115; 29/890.03; 29/890.52; 165/178

(58) Field of Classification Search .................. 62/115, 62/525; 29/890.03, 890.052, 890.07, 890.032, 29/890.039, 890.043; 165/151, 173, 175, 165/178, 79

See application file for complete search history.

(56) References Cited

U.S. PATENT DOCUMENTS

| | | | | |
|---|---|---|---|---|
| 3,362,187 A | * | 1/1968 | Kloster et al. | 62/347 |
| 4,089,368 A | * | 5/1978 | Bell et al. | 165/139 |
| 4,305,453 A | * | 12/1981 | Wagner | 165/69 |
| 5,210,932 A | * | 5/1993 | Tokura | 29/727 |
| 5,400,951 A | * | 3/1995 | Shiroyama et al. | 228/168 |
| 5,419,042 A | | 5/1995 | Kado | |
| 5,655,387 A | * | 8/1997 | Matambo et al. | 62/511 |
| 6,115,919 A | * | 9/2000 | Oswald et al. | 29/890.039 |
| 6,889,753 B2 | * | 5/2005 | Takamizawa et al. | 165/104.21 |

FOREIGN PATENT DOCUMENTS

| | | | |
|---|---|---|---|
| JP | 0481271 | | 3/1992 |
| JP | 6307736 | | 11/1994 |
| JP | 9-250850 A | * | 9/1997 |

* cited by examiner

Primary Examiner—Mohammad M. Ali
(74) Attorney, Agent, or Firm—Global IP Counselors

(57) ABSTRACT

A connecting method and structure is provided to reliably ensure the compressive strength of the joint between a heat transfer pipe and a capillary tube when connecting the capillary tube to the heat transfer pipe by direct brazing. In the connection structure between the heat transfer pipe and the capillary tube, a pinched part in which a pipe end part of the capillary tube is inserted and a brazing filler material pooling part for pooling on a pipe end face side of the pinched part the brazing filler material that flows into the pinched part are formed. When inserted into the pinched part, the capillary tube is brazed to the heat transfer pipe.

13 Claims, 13 Drawing Sheets

METHOD OF CONNECTING HEAT TRANSFER PIPE AND CAPILLARY TUBE

TECHNICAL FIELD

The present invention relates to a method of connecting a heat transfer pipe and a capillary tube, a jig for flatly crushing the heat transfer pipe, a structure for connecting the heat transfer pipe and the capillary tube, and a heat exchanger.

BACKGROUND ART

Among heat exchangers used in air conditioners and the like, a cross fin type is known, as shown in FIG. 1. FIG. 1 is a schematic perspective view that depicts a heat exchanger 101 as one example of a cross fin type heat exchanger.

The heat exchanger 101 comprises a plurality of plate fins 11 disposed in parallel at a prescribed interval, a plurality of heat transfer pipes 12 that pass through the plurality of plate fins 11 in the plate thickness direction, a plurality of U-shaped pipes 31, each U-shaped pipe 31 connecting the pipe end parts 12a of a pair of heat transfer pipes 12, a header pipe 32 that connects the pipe end parts 12a of the plurality of heat transfer pipes 12, and a plurality of capillary tubes 41 that branches from a distributor 33 and that is connected to the pipe end parts 12a of the heat transfer pipes 12.

The plurality of heat transfer pipes 12 passes through the plurality of plate fins 11 in the plate thickness direction, and each heat transfer pipe 12 is then expanded across its entire length (hereinafter, referred to as the primary flare fabrication) and joined to the plate fins 11. Furthermore, the pipe end part 12a of each heat transfer pipe 12 is further expanded in two stages (hereinafter, referred to as the secondary and tertiary flare fabrication) to form a large-diameter cylindrical flared part 14 and a tapered auxiliary flared part 15 on the pipe end face side of the flared part 14 (refer to FIG. 2). The U-shaped pipes 31, the header pipe 32, and the capillary tubes 41 are brazed to the flared part 14 formed in each pipe end part 12a.

Next, the conventional method of connecting and connection structure of the heat transfer pipe 12 and the capillary tubes 41 will be explained using FIG. 2 through FIG. 7. FIG. 2 is a cross-sectional view (before flat crushing) that depicts the flat crushing fabrication of the flared part 14, wherein a pinching unit 161 is employed. FIG. 3 is a cross-sectional view taken along the A—A line in FIG. 2. FIG. 4 is a cross-sectional view (after flat crushing) that depicts the flat crushing fabrication of the flared part 14, wherein the pinching unit 161 is employed. FIG. 5 is a cross-sectional view taken along the A—A line in FIG. 4. FIG. 6 is a view (a partially broken view) of the connection structure between the heat transfer pipe 12 and the capillary tube 41 as seen from the flat crushing direction of the flared part 14. FIG. 7 is a view (a partially broken view) from the B arrow direction in FIG. 6.

First, flat crushing fabrication is performed on the flared part 14 of the heat transfer pipe 12 in the pipe latitudinal direction to form a pinched part 114a, wherein a tube end part 41a of the capillary tube 41 is inserted.

Herein, the pinching unit 161 used in the flat crushing fabrication has a pair of levers 162, and the tip parts thereof are capable of mutually breaking away and drawing near. The opposing surface of the tip part of each lever 162 is provided with a U-shaped groove 162a. In addition, a pin 163 is provided between the tip parts of the pair of levers 162. The pin 163 comprises a plate-shaped retaining part 163a, and a columnar part 163b provided on the tip face of the retaining part 163a. The columnar part 163b is disposed between the U-shaped grooves 162a of the pair of levers 162, and is the part that, by being interposed between the pair of levers 162 in the lateral direction, forms a pinched part 114a of a tubular part 114b (refer to FIG. 4 and FIG. 5), having a space wherein the tube end part 41a of the capillary tube 41 is inserted.

Furthermore, as shown in FIG. 2 and FIG. 3, the pipe end part 12a of the heat transfer pipe 12, wherein the capillary tube 41 is connected, is inserted between the tip parts of the pair of levers 162 of the pinching unit 161, and the end face of the pipe end part 12a is brought into contact with the tip face of the retaining part 163a. Thereby, the columnar part 163b is inserted in the pipe end part 12a.

Next, the tip parts of the pair of levers 162 are closed. Upon doing so, as shown in FIG. 4 and FIG. 5, the tubular part 114b, having a space wherein the tube end part 41a of the capillary tube 41 is inserted, remains, the substantial entirety of the flared part 114 is flatly crushed in the pipe latitudinal direction, thus forming the pinched part 114a. The pinched part 114a has a tubular part 114b having a space wherein the tube end part 41a of the capillary tube 41 is inserted, and a flat flatly crushed sealed part 114c formed on both sides of the tubular part 114b.

Next, as shown in FIG. 6 and FIG. 7, the tube end part 41a of the capillary tube 41 is inserted in the tubular part 114b of the pipe end part 12a of the heat transfer pipe 12. Further, the tube end part 41a of the capillary tube 41 and the tubular part 114b are brazed. To seal the pipe end part 12a of the heat transfer pipe 12, the flatly crushed sealed part 114c is brazed.

Thus, the heat transfer pipe 12 and the capillary tube 41 having a diameter smaller than the heat transfer pipe 12 are connected by direct brazing (e.g., refer to Patent Document 1).

Patent Document 1
Japanese Published Patent Application No. HEI 6-307736

SUMMARY OF THE INVENTION

In the method of connecting and in the connection structure of the abovementioned heat transfer pipe 12 and the capillary tube 41, the wall thickness of the heat transfer pipe 12 unfortunately thins due to the staged expansion fabrication of the primary through tertiary flare fabrication, and the joint between the heat transfer pipe 12 and the capillary tube 41 is therefore heated during brazing, principally the capillary tube 41 (specifically the C region shown in FIG. 6 and FIG. 7), so as to prevent overheating of the heat transfer pipe 12. Consequently, heating of the part on the opposite side of the pipe end face side of the pinched part 114a is insufficient, making it difficult for brazing filler material to flow to the part on the opposite side of the pipe end face side of the pinched part 114a (refer to brazing filler material D shown by the hatched lines in FIG. 6 and FIG. 7).

Thereby, the joining of the heat transfer pipe 12 and the capillary tube 41 in the part on the opposite side of the pipe end face side of the pinched part 114a becomes inadequate, producing a concentration of stress in the gap (refer to the E region in FIG. 7) between the outer periphery surface of the capillary tube 41 and the inner surface of the pinched part 114a, which may result in a decline in compressive strength. Thus, in the abovementioned connecting method of the heat transfer pipe 12 and the capillary tube 41, the compressive strength of the joint may not be reliably ensured.

It is an object of the present invention to reliably ensure the compressive strength of the joint between a heat transfer pipe and a capillary tube when directly brazing the capillary tube to the heat transfer pipe.

A method of connecting a heat transfer pipe and a capillary tube according to the first invention is a method of connecting a heat transfer pipe and a capillary tube, wherein the capillary tube having a diameter smaller than that of the heat transfer pipe is connected to a pipe end part of the heat transfer pipe constituting a heat exchanger, comprising the steps of a flaring fabrication process, a flat crushing process, and a brazing process. The flaring fabrication process forms a cylindrical flared part, having a pipe diameter larger than that of the heat transfer pipe, in the pipe end part of the heat transfer pipe. The flat crushing process, by flatly crushing in the pipe latitudinal direction only the part on the opposite side of the pipe end face side of the flared part, forms a pinched part wherein the tube end part of the capillary tube is inserted from the pipe end face side of the flared part, and a brazing filler material pooling part for pooling on the pipe end face side of the pinched part the brazing filler material that flows into the pinched part. The brazing process brazes the capillary tube to the heat transfer pipe by inserting the tube end part of the capillary tube into the pinched part and flowing brazing filler material into the brazing filler material pooling part.

In the method of connecting the heat transfer pipe and the capillary tube, because the pinched part is formed only in the part on the opposite side of the pipe end face side of the flared part and the brazing filler material pooling part is formed on the pipe end face side of the pinched part, the heat of the brazing filler material pooled in the brazing filler material pooling part is transmitted to the part on the opposite side of the pipe end face side of the pinched part and, attendant therewith, the brazing filler material in the brazing filler material pooling part flows to the part on the opposite side of the pipe end face side of the pinched part. Thereby, because the joining of the heat transfer pipe and the capillary in the part on the opposite side of the pipe end face side of the pinched part is strengthened, the compressive strength of the joint between the heat transfer pipe and capillary tube can be reliably ensured.

The method of connecting a heat transfer pipe and a capillary tube according to the second invention is the method of connecting a heat transfer pipe and a capillary tube according to the first invention, wherein in the flaring fabrication process, an auxiliary flared part having a pipe diameter larger than that of the flared part is further formed on the pipe end face side of the flared part.

Because the auxiliary flared part is further formed in the method of connecting the heat transfer pipe and the capillary tube, working efficiency can be improved when the brazing filler material flows into the brazing filler material pooling part.

The method of connecting a heat transfer pipe and a capillary tube according to the third invention is the method of connecting a heat transfer pipe and a capillary tube according to the first or second inventions, wherein the flared part formed in the flaring fabrication process has a length of at least 5 mm and less than 10 mm in the pipe longitudinal direction. The length in the pipe longitudinal direction of the pinched part formed in the flat crushing process is at least 0.4 times and less than 0.6 times the length of the flared part in the pipe longitudinal direction.

Setting the dimensions of the flared part and the pinched part in a prescribed length range in the method of connecting the heat transfer pipe and the capillary tube further improves the effect of transmitting the heat of the brazing filler material pooled in the brazing filler material pooling part to the part on the opposite side of the pipe end face side of the pinched part.

A flat crushing jig of a heat transfer pipe according to the fourth invention is a flat crushing jig of a heat transfer pipe for forming a pinched part, wherein the tube end part of the capillary tube is inserted in the flared part when connecting by brazing the capillary tube having a diameter smaller than that of the heat transfer pipe to the flared part formed in the pipe end part of the heat transfer pipe constituting the heat exchanger, comprising: a pin member, and a pair of grabbing members. The pin member comprises a first columnar part disposed so that the inside of the flared part extends in the pipe longitudinal direction and having a diameter so that the tube end part of the capillary tube can be inserted, and a second columnar part disposed on the pipe end face side of the first columnar part and having a diameter larger than that of the first columnar part. The pair of grabbing members, by interposing the flared part from the pipe latitudinal direction in a state wherein the pin member is disposed inside the flared part, is capable of forming the pinched part by flatly crushing in the pipe latitudinal direction only the part corresponding to the first columnar part of the flared part.

Because the pin member in the jig for flatly crushing the heat transfer pipe has the second columnar part on the pipe end face side of the first columnar part, the pinched part can be formed in the flared part and the brazing filler material pooling part can also be formed.

A heat transfer pipe and capillary tube connection structure according to the fifth invention is a heat transfer pipe and capillary tube connection structure that connects a capillary tube having a diameter smaller than that of the heat transfer pipe to the pipe end part of the heat transfer pipe constituting the heat exchanger, wherein by flatly crushing in the pipe latitudinal direction only the part on the opposite side of the pipe end face side of the cylindrical flared part having a pipe diameter larger than that of the heat transfer pipe formed in the pipe end part of the heat transfer pipe, a pinched part wherein the tube end part of the capillary tube is inserted from the pipe end face side of the flared part, and a brazing filler material pooling part for pooling on the pipe end face side of the pinched part the brazing filler material that flows into the pinched part are formed; and in a state inserted from the pipe end face side of the flared part into the pinched part, the tube end part of the capillary tube is brazed to the heat transfer pipe.

In the connection structure between the heat transfer pipe and the capillary tube, because the pinched part is formed only in the part on the opposite side of the pipe end face side of the flared part and the brazing filler material pooling part is formed on the pipe end face side of the flared part, the heat of the brazing filler material pooled in the brazing filler material pooling part can be transmitted to the part on the opposite side of the pipe end face side of the pinched part and, attendant therewith, the brazing filler material pooled in the brazing filler material pooling part also flows to the part on the opposite side of the pipe end face side of the pinched part. Thereby, the joining of the heat transfer pipe and the capillary in the part on the opposite side of the pipe end face side of the pinched part is strengthened, and the compressive strength of the joint between the heat transfer pipe and the capillary tube can consequently be reliably ensured.

The heat transfer pipe and capillary tube connection structure according to the sixth invention is the heat transfer pipe and capillary tube connection structure according to the fifth invention, wherein the auxiliary flared part that encloses the perimeter of the brazing filler material pooling part is further formed on the pipe end face side of the brazing filler material pooling part.

Because the auxiliary flared part is further formed in the connection structure between the heat transfer pipe and the capillary tube, work efficiency can be further improved when the brazing filler material flows into the brazing filler material pooling part.

The heat transfer pipe and capillary tube connection structure according to the seventh invention is the heat transfer pipe and capillary tube connection structure according to the fifth or sixth inventions, wherein the flared part has a length in the pipe longitudinal direction of at least 5 mm and less than 10 mm. The length of the pinched part in the pipe longitudinal direction is at least 0.4 times and less than 0.6 times the length of the flared part in the pipe longitudinal direction.

Setting the dimensions of the flared part and the pinched part in a prescribed length range in the structure of connecting the heat transfer pipe and the capillary tube further improves the effect of transmitting the heat of the brazing filler material pooled in the brazing filler material pooling part to the part on the opposite side of the pipe end face side of the pinched part.

A heat exchanger according to the eighth invention comprises: a plurality of plate fins arranged in parallel at a prescribed interval; a plurality of heat transfer pipes that pass through the plurality of plate fins in the plate thickness direction; and a capillary tube connected to the pipe end part of each heat transfer pipe and having a diameter smaller than that of the heat transfer pipe. The heat transfer pipe and the capillary tube are connected by the heat transfer pipe and capillary tube connection structure according to any one invention of the fifth through seventh inventions.

Adopting a connection structure in this heat exchanger that can reliably ensure the compressive strength of the joint between the heat transfer pipe and the capillary tube improves the reliability related to the compressive strength.

DETAILED DESCRIPTION OF THE PREFERRED EMBODIMENTS

The following explains one embodiment of the present invention, referencing the drawings.

(1) Constitution of the Heat Exchanger

Figure 1:
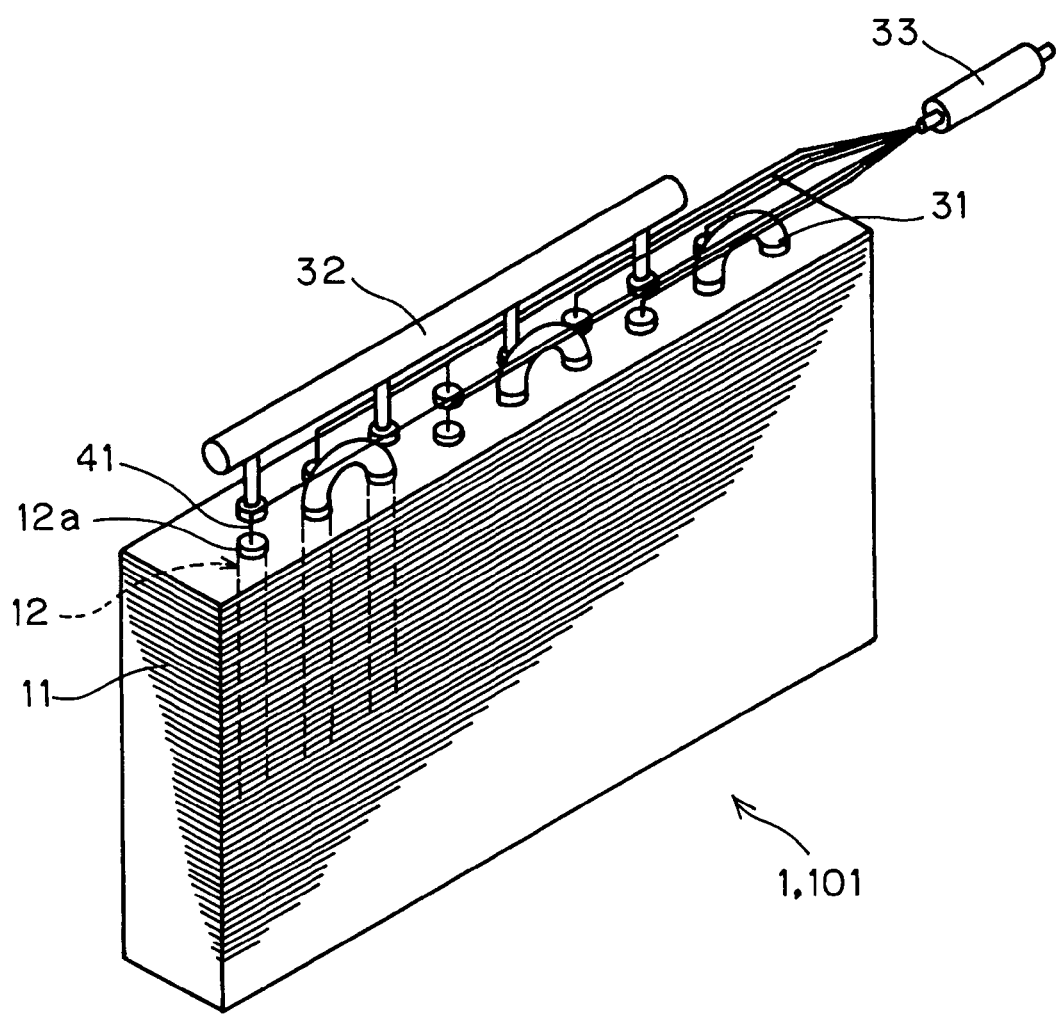
FIG. 1 is a schematic perspective view that depicts a cross fin type heat exchanger.
Figure 2:
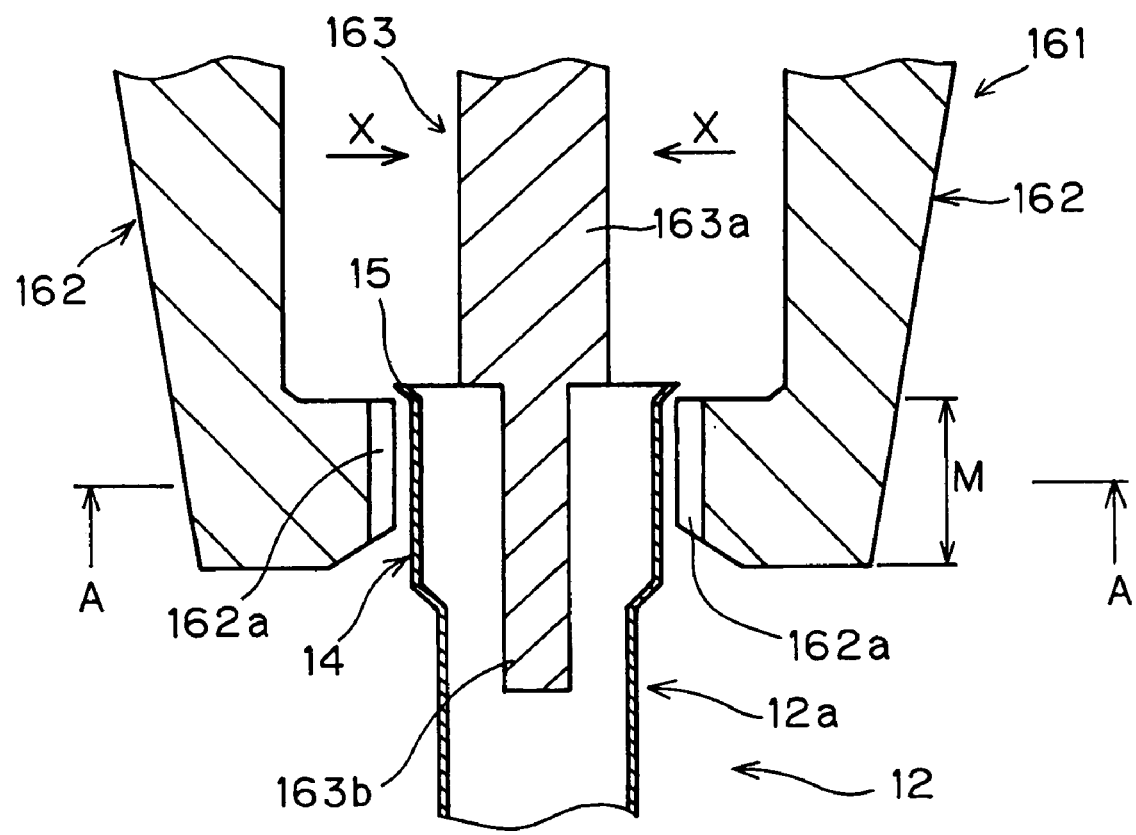
FIG. 2 is a cross-sectional view (before flat crushing) that depicts the flat crushing fabrication of the flared part, wherein a pinching unit is used.
Figure 3:
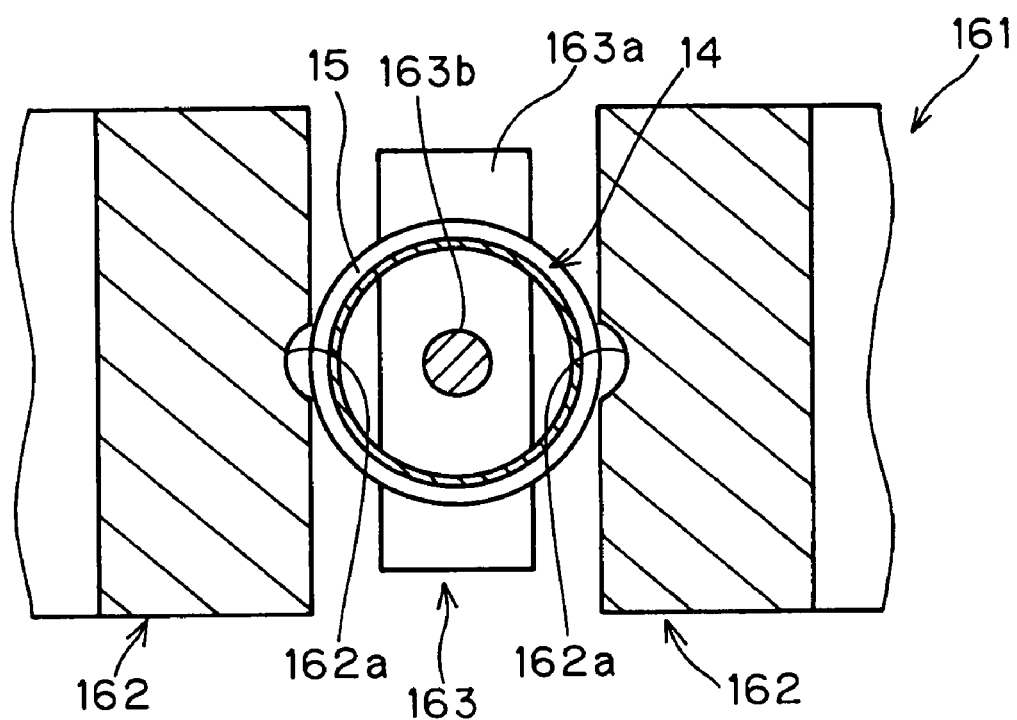
FIG. 3 is a cross-sectional view taken along the A—A line in FIG. 2.
Figure 4:
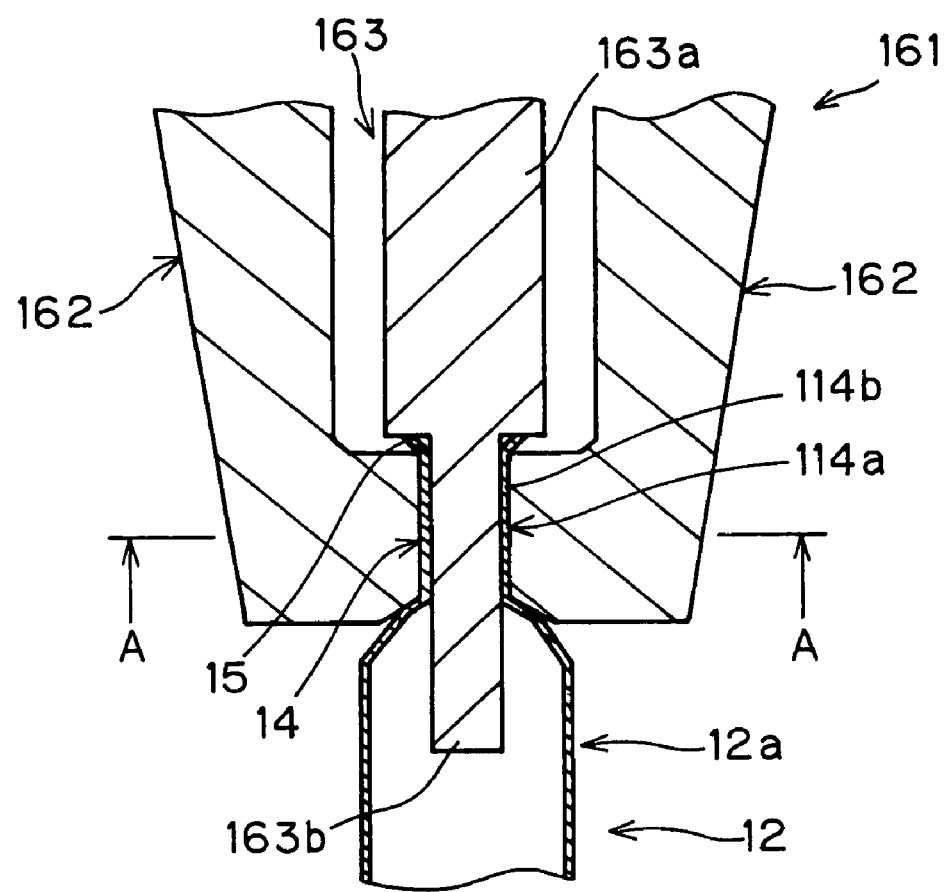
FIG. 4 is a cross-sectional view (after flat crushing) that depicts the flat crushing fabrication of the flared part, wherein the pinching unit is used.
Figure 5:
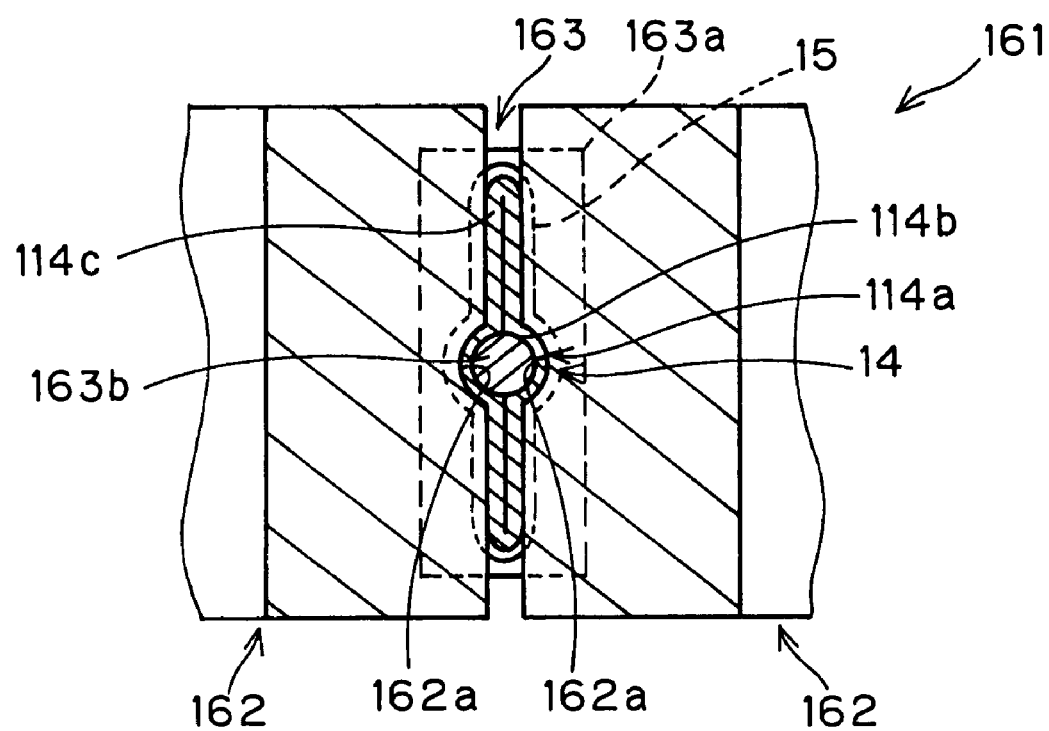
FIG. 5 is a cross-sectional view taken along the A—A line in FIG. 4.
Figure 6:
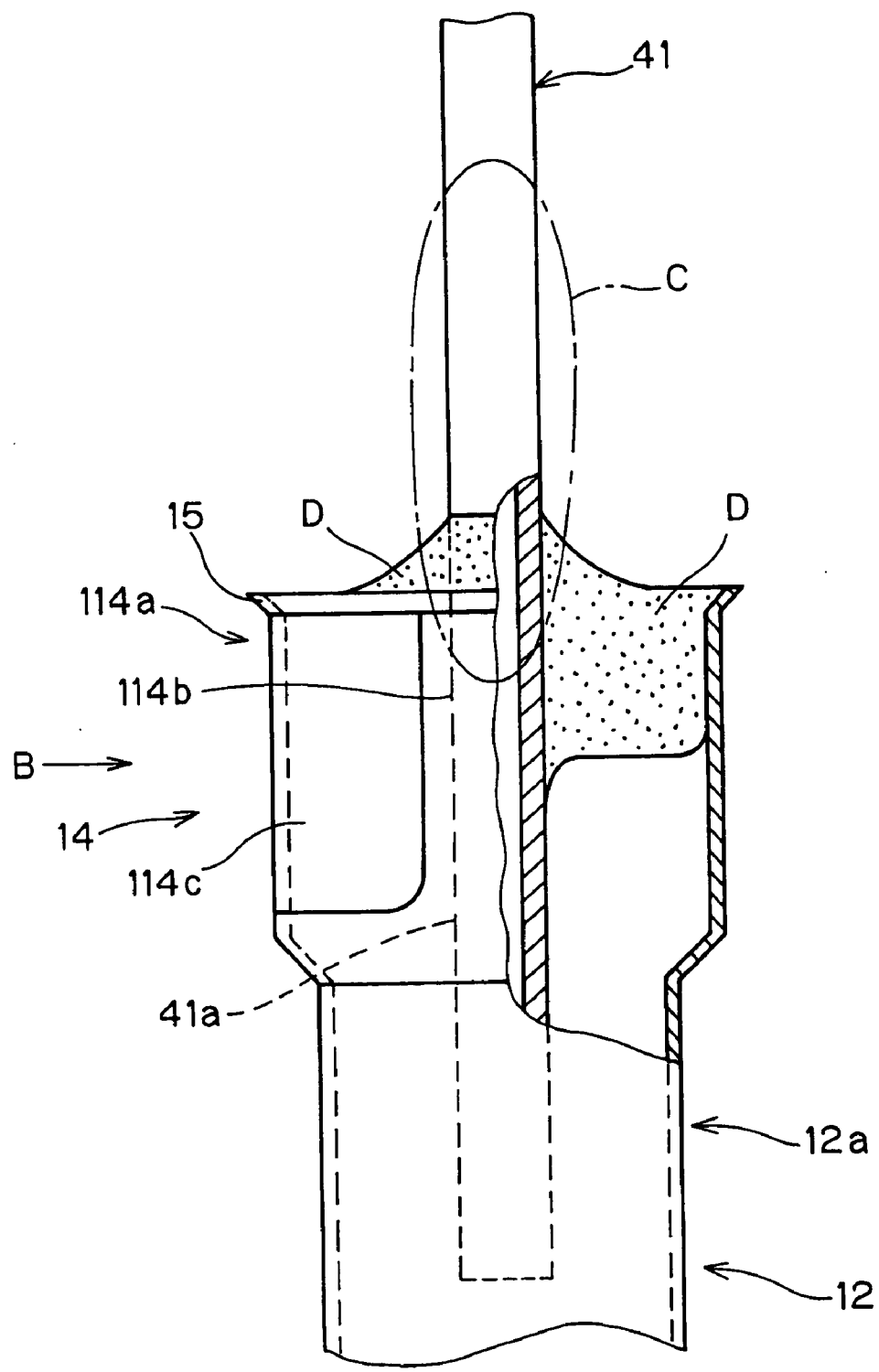
FIG. 6 is a view (a partially broken view) of the connection structure of the heat transfer pipe and capillary tube, viewed from the flat crushing direction of the flared part.
Figure 7:
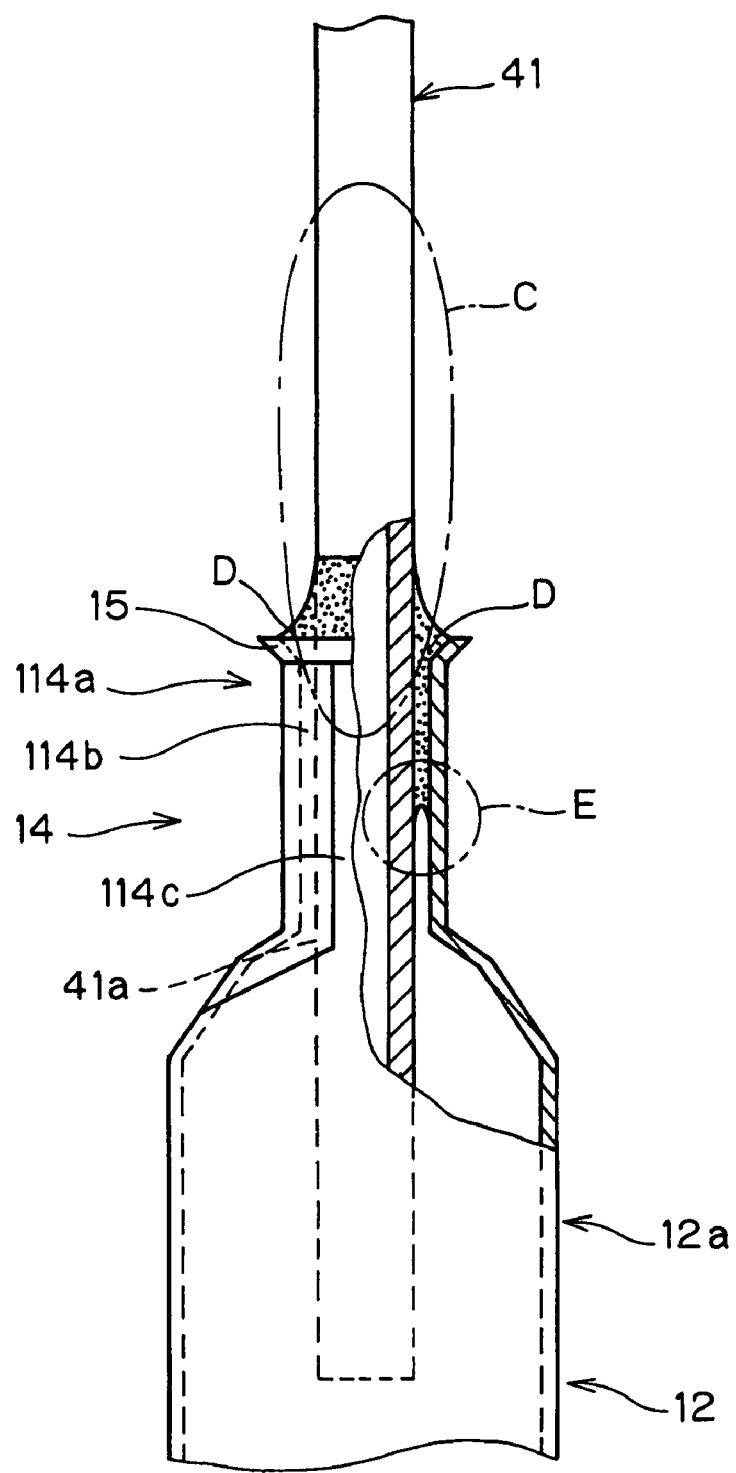
FIG. 7 is a view (a partially broken view) in the B arrow direction in FIG. 6.

A heat exchanger 1, as shown in FIG. 1, comprises a plurality of plate fins 11 disposed in parallel at a prescribed interval, a plurality of heat transfer pipes 12 that pass through the plurality of plate fins 11 in the plate thickness direction, a plurality of U-shaped pipes 31, each U-shaped pipe 31 connecting the pipe end parts 12a of a pair of heat transfer pipes 12, a header pipe 32 that connects the pipe end parts 12a of the plurality of heat transfer pipes 12, and a plurality of capillary tubes 41 that branches from a distributor 33 and that is connected to the pipe end parts 12a of the heat transfer pipes 12.

The plurality of heat transfer pipes 12 pass through the plurality of plate fins 11 in the plate thickness direction, and each heat transfer pipe 12 is then expanded across its entire length (hereinafter, referred to as the primary flare fabrication) and joined to the plate fins 11. Furthermore, the pipe end part 12a of each heat transfer pipe 12 is further expanded in two stages (hereinafter, referred to as the secondary and tertiary flare fabrication) to form a large-diameter cylindrical flared part 14 and a tapered auxiliary flared part 15 on the pipe end face side of the flared part 14 (refer to FIG. 8). The U-shaped pipes 31, the header pipe 32, and the capillary tubes 41 are brazed to the flared part 14 formed in each pipe end part 12a.

Figure 8:
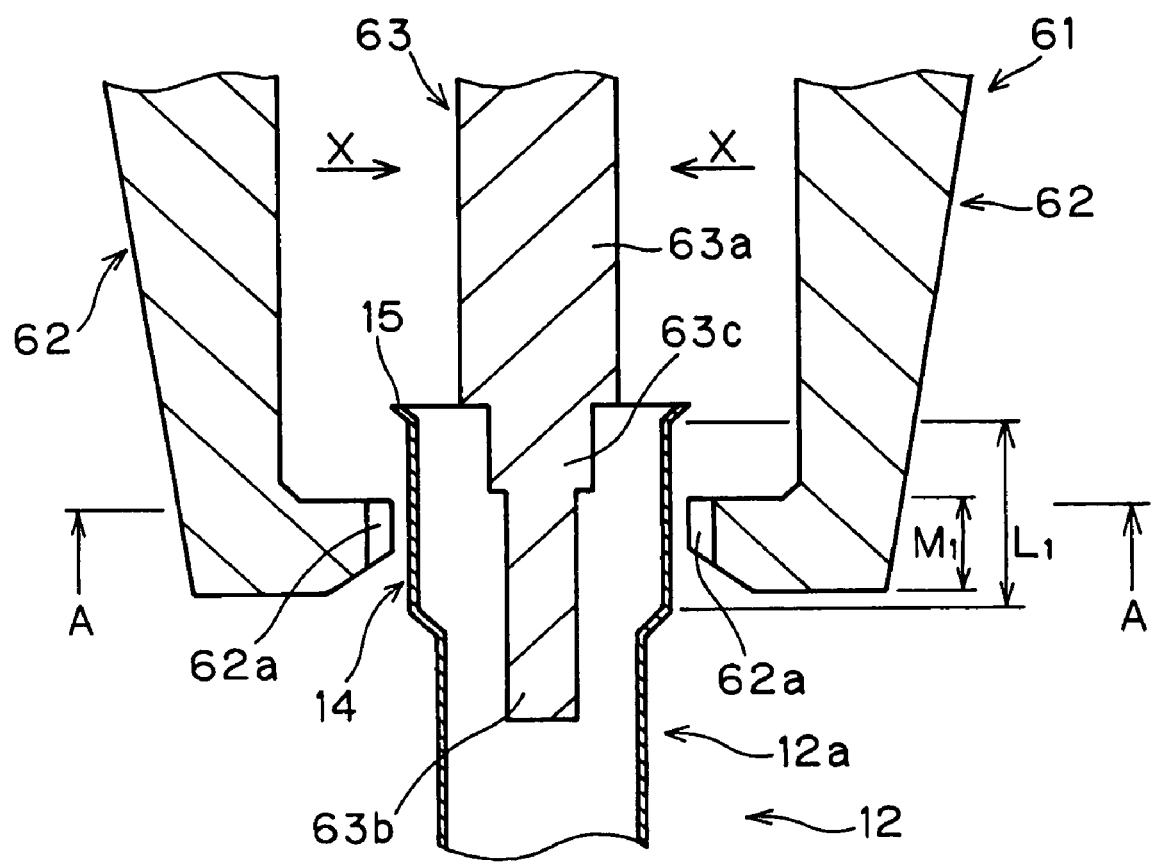
FIG. 8 is a cross-sectional view (before flat crushing) that depicts the flat crushing fabrication of the flared part, wherein the pinching unit is used.
Figure 9:
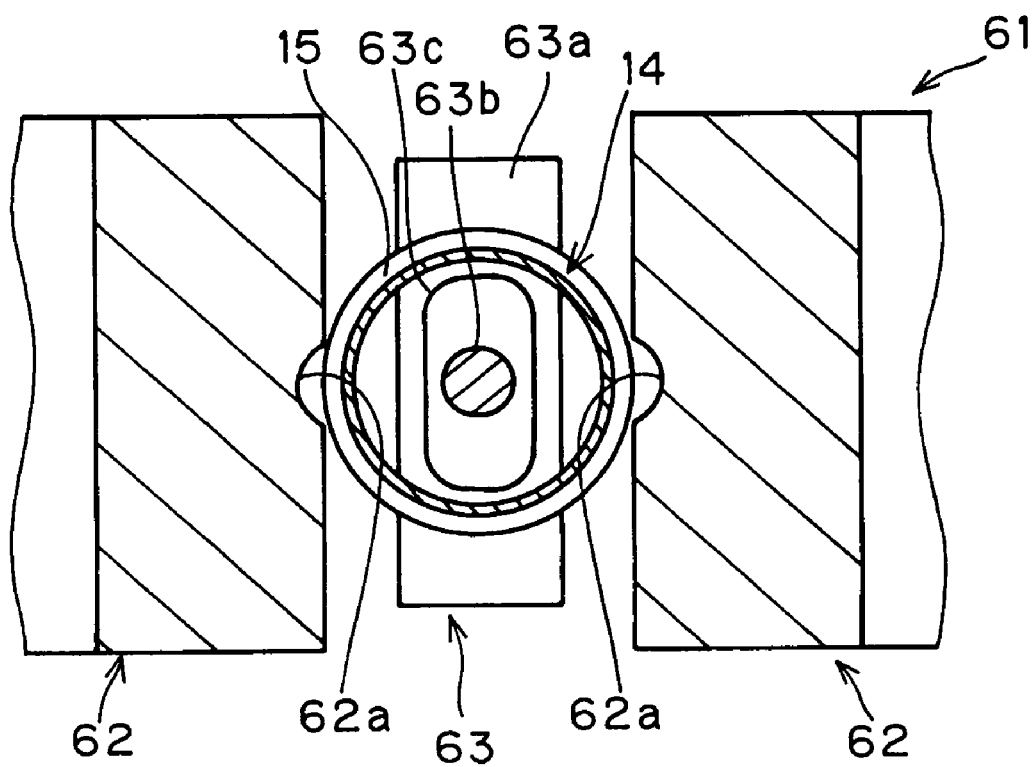
FIG. 9 is a cross-sectional view taken along the A—A line in FIG. 8.
Figure 10:
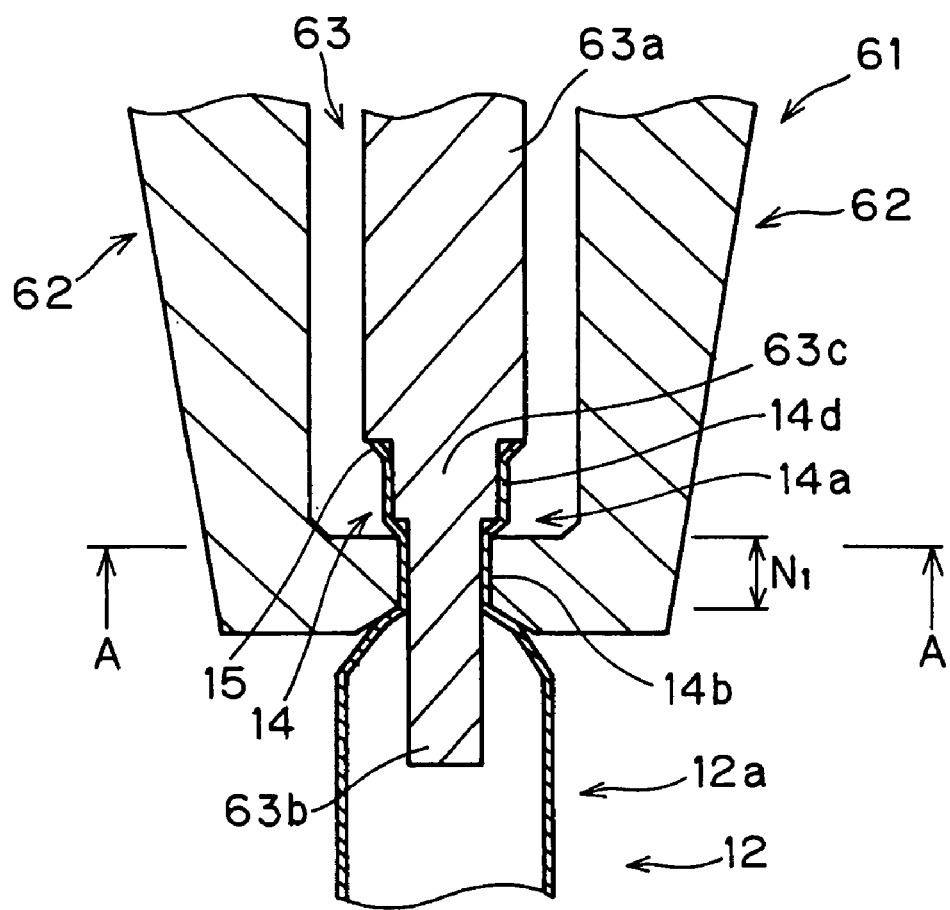
FIG. 10 is a cross-sectional view (after flat crushing) that depicts the flat crushing fabrication of the flared part, wherein the pinching unit is used.
Figure 11:
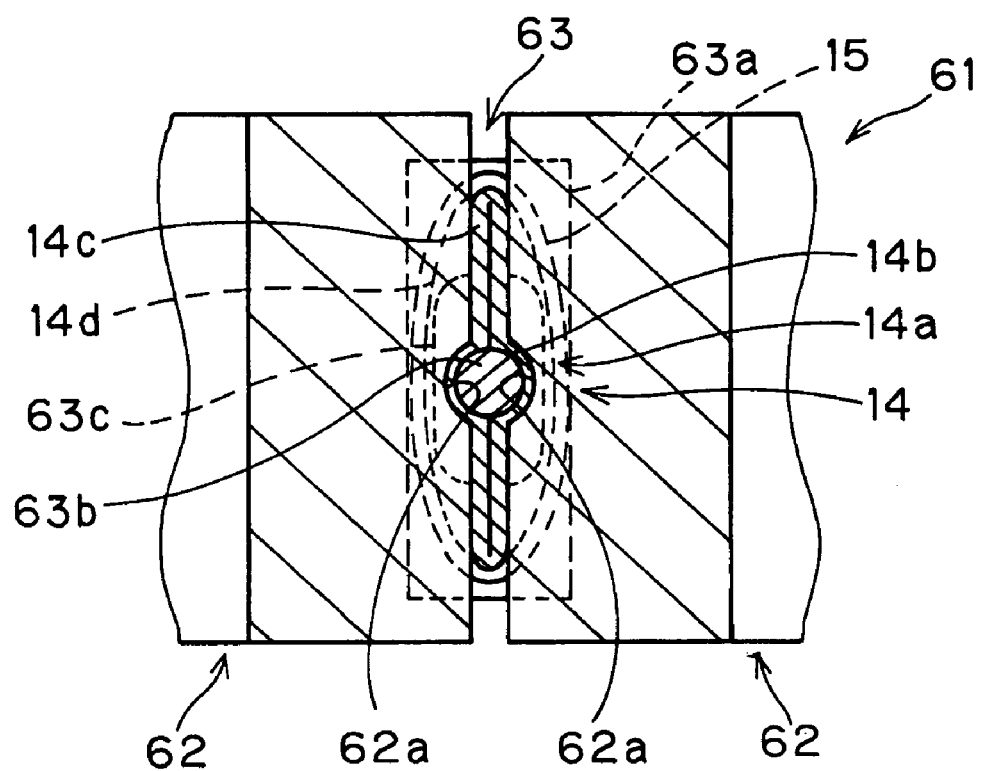
FIG. 11 is a cross-sectional view taken along the A—A line in FIG. 10.
Figure 12:
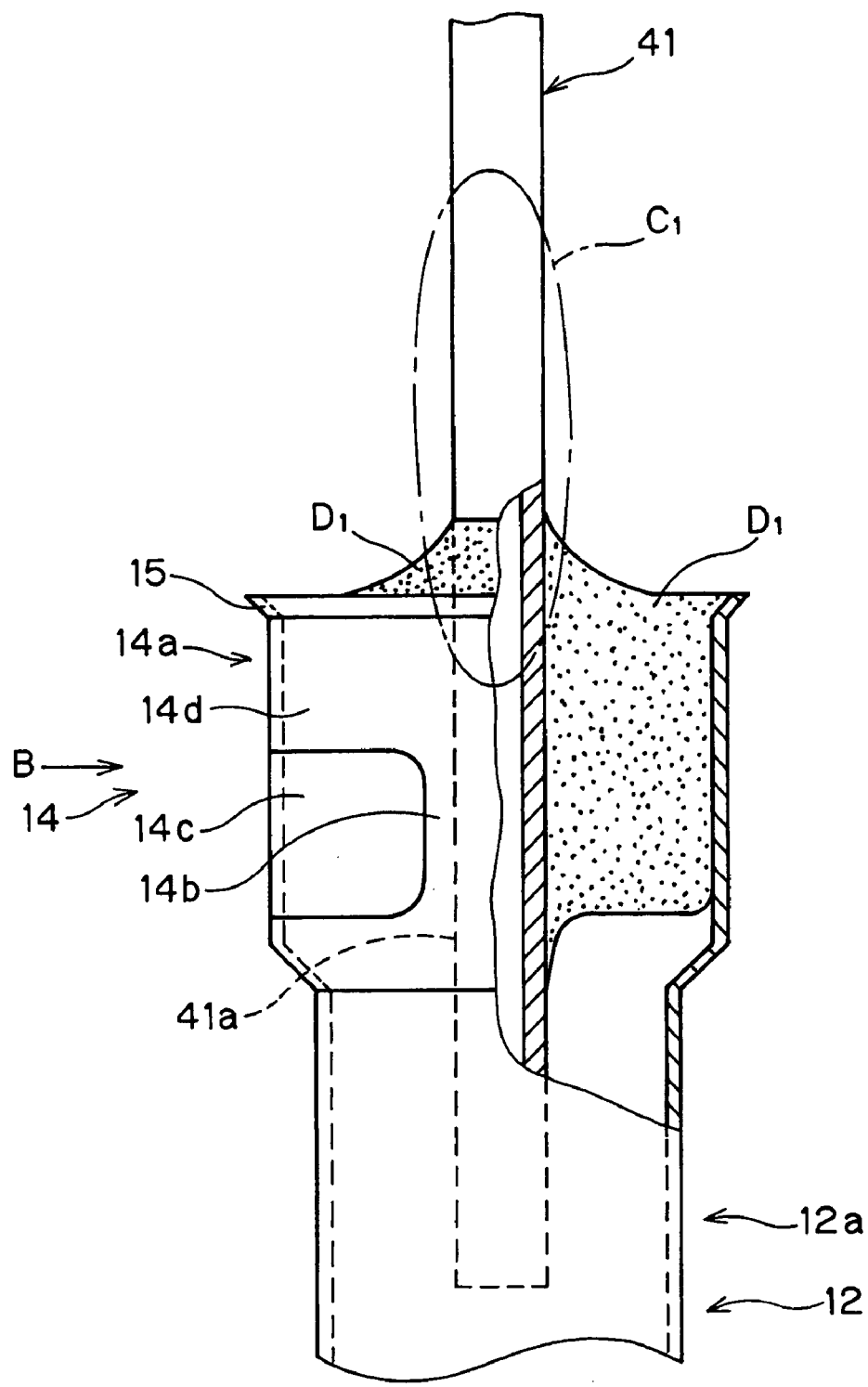
FIG. 12 is a view (a partially broken view) of the connection structure of the heat transfer pipe and capillary tube, viewed from the flat crushing direction of the flared part.
Figure 13:
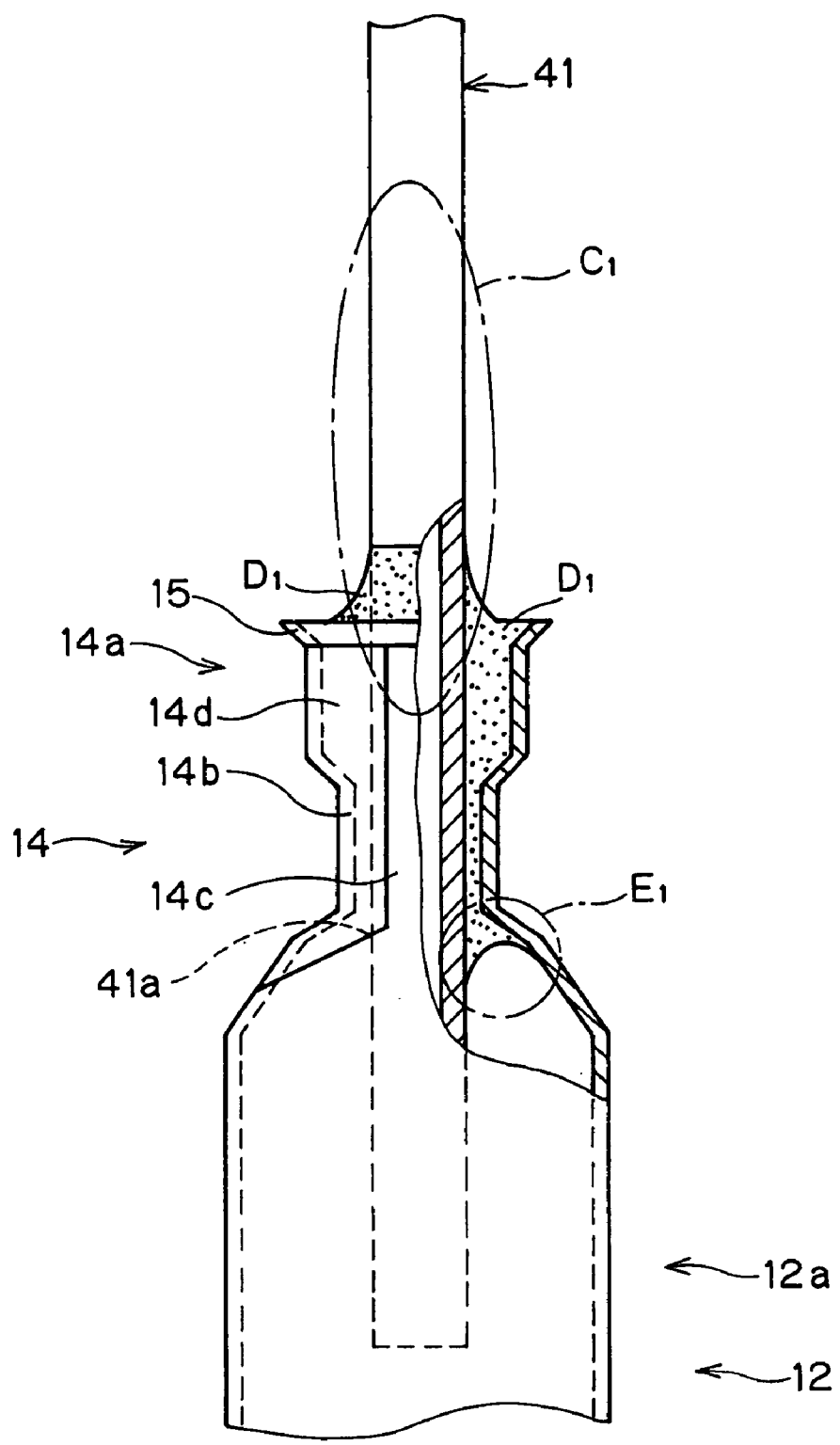
FIG. 13 is a view (a partially broken view) in the B arrow direction in FIG. 12.

(2) Method of Connecting and Connection Structure of the Heat Transfer Pipe and the Capillary Tube Next, the method of connecting and connection structure of the heat transfer pipe 12 and the capillary tubes 41 will be explained using FIG. 8 through FIG. 13. FIG. 8 is a cross-sectional view (before flat crushing) that depicts the flat crushing fabrication of the flared part 14, wherein a pinching unit 61 is employed. FIG. 9 is a cross-sectional view taken along the A—A line in FIG. 8. FIG. 10 is a cross-sectional view (after flat crushing) that depicts the flat crushing fabrication of the flared part 14, wherein the pinching unit 61 is employed. FIG. 11 is a cross-sectional view taken along the A—A line in FIG. 10. FIG. 12 is a view (a partially broken view) of the connection structure between the heat transfer pipe 12 and the capillary tube 41 as seen from the flat crushing direction of the flared part 14. FIG. 13 is a view (a partially broken view) from the B arrow direction in FIG. 12.

(A) Flaring Fabrication Process

First, secondary flare fabrication and tertiary flare fabrication are performed on the pipe end part 12a of each heat transfer pipe 12 to form a large-diameter cylindrical flared part 14 and a tapered auxiliary flared part 15 on the pipe end face side of the flared part 14 (refer to FIG. 8). Furthermore, in the present embodiment, the flared part 14 has a length (refer to L1 in FIG. 8) of at least 5 mm and less than 10 mm in the pipe longitudinal direction.

(B) Flat Crushing Process

Next, a pinched part 14a, wherein the tube end part 41a of the capillary tube 41 is inserted, is formed by flat crushing fabrication of the flared part 14 of the heat transfer pipe 12 in the pipe latitudinal direction.

Herein, the pinching unit 61 used in the flat crushing process has a pair of levers 62, and the tip parts thereof are capable of mutually breaking away and drawing near. The opposing surface of the tip part of each lever 62 is provided with a U-shaped groove 62a. The tip part of this lever 62 is provided so that it corresponds only to the first columnar part 63b, discussed later. Consequently, the length M1 of the tip part of the lever 62 is shorter than the length M of the tip part of the lever 162 of the conventional pinching unit 161 (refer to FIG. 2 through FIG. 5). In addition, a pin 63 is provided between the tip parts of the pair of levers 62. The pin 63 comprises a plate-shaped retaining part 63a, and the first columnar part 63b and a second columnar part 63c provided on the tip face of the retaining part 63a. The first columnar part 63b is disposed between the pair of U-shaped grooves 62a, and is the part that, by being interposed by the U-shaped grooves 62a of the levers 62 in the lateral direction, forms a tubular part 14b, having a space wherein the tube end part 41a of the capillary tube 41 are inserted, in the pinched part 14a (refer to FIG. 10 and FIG. 11). The second columnar part 63c is a part having a diameter larger than that of the first columnar part 63b, and is disposed between the tip face of the retaining part 63a and the first columnar part 63b. More specifically, when the pin 63 is viewed from the axial direction as shown in FIG. 9, the second columnar part 63c includes the entirety of the first columnar part 63b, and is somewhat long and narrow-shaped along the opposing surface of the lever 62.

Furthermore, as shown in FIG. 8 and FIG. 9, the pipe end part 12a of the heat transfer pipe 12, wherein the capillary tube 41 is connected, is inserted between the tip parts of the pair of levers 62 of the pinching unit 61, and the end face of the pipe end part 12a is brought into contact with the tip face of the retaining part 63a. Thereby, the first columnar part 63b and the second columnar part 63c are inserted in the pipe end part 12a.

Next, the tip parts of the pair of levers 62 are closed in the X arrow direction. Upon doing so, as shown in FIG. 10 and FIG. 11, the tubular part 14b, having a space wherein the tube end part 41a of the capillary tube 41 is inserted, remains, and only the part of the flared part 14 corresponding to the first columnar part 63b is flatly crushed in the pipe latitudinal direction, thus forming the pinched part 14a. The pinched part 14a has a tubular part 14b having a space wherein the tube end part 41a of the capillary tube 41 is inserted, and a flat flatly crushed sealed part 14c formed on both sides of the tubular part 14b. At this time, along with the formation of the pinched part 14a, the part on the pipe end face side of the pinched part 14a is deformed so that it is flattened; however, the extent of this deformation is limited by the second columnar part 63c, and a substantially elliptically shaped brazing filler material pooling part 14d is formed. This brazing filler material pooling part 14d is capable of pooling the brazing filler material that flows into the pinched part 14a. Furthermore, in the pipe longitudinal direction of the pinched part 14a formed in the flat crushing process in the present embodiment, the length N1 is at least 0.4 times and less than 0.6 times the length L1 in the pipe longitudinal direction of the flared part 14.

(C) Brazing Process

Next, as shown in FIG. 12 and FIG. 13, the tube end part 41a of the capillary tube 41 is inserted in the tubular part 14b of the pipe end part 12a of the heat transfer pipe 12. Further, the tube end part 41a of the capillary tube 41 and the tubular part 14b are brazed. To seal the pipe end part 12a of the heat transfer pipe 12, the flatly crushed sealed part 14c is brazed.

Herein, as in the conventional method of connecting by brazing, the heating at the time of brazing is performed principally on the capillary tube 41 to prevent overheating of the heat transfer pipe 12 (refer to region C1 in FIG. 12 and FIG. 13). However, because the flat crushing process in the present embodiment forms the pinched part 14a only in the part on the opposite side of the pipe end face side of the flared part 14 and forms a brazing filler material pooling part 14d on the pipe end face side of the pinched part 14a, the brazing filler material (refer to brazing filler material D1 shown by the hatched lines in FIG. 12 and FIG. 13) that flows into and pools in the brazing filler material pooling part 14d during brazing can transmit the heat to the part on the opposite side of the pipe end face side of the pinched part 14a. Consequently, because the brazing filler material that pools in the brazing filler material pooling part 14d also flows to the part on the opposite side of the pipe end face side of the pinched part 14a, a part is not produced that tends to concentrate stress in the gap (refer to region E1 in FIG. 13) between the outer peripheral surface of the capillary tube 41 and the inner surface of the pinched part 14a, unlike the conventional method of connecting by brazing.

Thereby, the joining of the heat transfer pipe 12 and the capillary tube 41 in the part on the opposite side of the pipe end face side of the pinched part 14a is strengthened, and the compressive strength of the joint between the heat transfer pipe 12 and the capillary tube 41 is reliably ensured.

Thus, the heat transfer pipe 12 and the capillary tube 41 having a diameter smaller than the heat transfer pipe 12 are connected by direct brazing.

(3) Features of the Connecting Method and Connection Structure of the Heat Transfer Pipe and Capillary Tube The connecting method and the connection structure of the heat transfer pipe 12 and the capillary tube 41 in the present embodiment have the following features.

(A) In the method of connecting and in the connection structure of the heat transfer pipe 12 and the capillary tube 41 according to the present embodiment, the heat of the brazing filler material pooled in the brazing filler material pooling part 14d formed in the flared part 14 in the flat crushing process is transmitted to the part on the opposite side of the pipe end face side of the pinched part 14a and, attendant therewith, the brazing filler material pooled in the brazing filler material pooling part 14d flows to the part on the opposite side of the pipe end face side of the pinched part 14a. Thereby, because the joining of the heat transfer pipe 12 and the capillary tube 41 in the part on the opposite side of the pipe end face side of the pinched part 14a is strengthened, the compressive strength of the joint between the heat transfer pipe 12 and the capillary tube 41 can be reliably ensured.

In addition, the same as in the conventional method of connecting by brazing, the method of connecting by brazing in the present embodiment is capable of connecting by brazing under conditions that heat principally the capillary tube 41, and therefore working efficiency also does not suffer.

In addition, it is easy to supply to the entirety of the pinched part 14a the brazing filler material that flows into the brazing filler material pooling part 14d because the shape of the brazing filler material pooling part 14d in the present embodiment is substantially elliptically cylindrical so that it encloses the entirety of the pinched part 14a when viewed from the longitudinal direction of the heat transfer pipe 12.

Furthermore, by adopting such a connecting method and connection structure of the heat transfer pipe 12 and the capillary tube 41, the reliability of the compressive strength of the heat exchanger 1 can be improved.

(B) Because the auxiliary flared part 15 is further formed in the method of connecting and in the connection structure of the heat transfer pipe 12 and the capillary tube 41 in the present embodiment, working efficiency can be improved when the brazing filler material flows into the brazing filler material pooling part 14d.

(C) Setting the dimensions of the flared part 14 and the pinched part 14a in a prescribed length range in the method of connecting and in the connection structure of the heat transfer pipe 12 and the capillary tube 41 in the present embodiment further improves the effect of transmitting the heat of the brazing filler material pooled in the brazing filler material pooling part 14d to the part on the opposite side of the pipe end face side of the pinched part 14a.

(D) The pinching unit 61 of the heat transfer pipe 12 of the present embodiment comprises: a pin 63 comprising a first columnar part 63b disposed so that the inside of the flared part 14 extends in the pipe longitudinal direction and having a diameter so that the pipe end part 41a of the capillary tube 41 can be inserted, and a second columnar part 63c disposed on the pipe end face side of the first columnar part 63b and having a diameter larger than that of the first columnar part 63b; and a pair of levers 62 that, by interposing the flared part 14 from the pipe latitudinal direction in a state wherein the pin 63 is disposed inside the flared part 14, is capable of forming the pinched part 14a by flatly crushing in the pipe latitudinal direction only the part corresponding to the first columnar part 63b of the flared part 14. Consequently, the pinched part 14a of the flared part 14 can be formed, and the brazing filler material pooling part 14d can also be formed.

(4) Other Embodiments

The above explained embodiments of the present invention referencing the drawings, but the specific constitution is not limited to these embodiments, and it is understood that variations and modifications may be effected without departing from the spirit and scope of the invention.

(A) The shape of the entire heat exchanger is not limited to the substantially rectangular shaped heat exchanger shown in FIG. 1, and may also be another shape.

(B) The shape of the second columnar part of the pinching unit is not limited to the substantially rectangular shape shown in FIG. 8 through FIG. 11, and may be another shape as long as it is a shape having a cross section with a diameter larger than that of the first columnar part.

INDUSTRIAL APPLICABILITY

The use of the present invention can reliably ensure the compressive strength of the joint between the heat transfer pipe and the capillary tube when connecting the heat transfer pipe and the capillary tube by direct brazing.

What is claimed is:

1. A method comprising:
   providing a heat transfer pipe including a pipe end part;
   providing a capillary tube having a tube end part with a diameter smaller than that of said pipe end part of said heat transfer pipe;
   performing a flaring fabrication process on said pipe end part of said heat transfer pipe to form a cylindrical flared part, having pipe diameter larger than that of an initial pipe diameter of said pipe end part of said heat transfer pipe;
   performing a flat crushing process that includes flatly crushing in a pipe latitudinal direction only a portion of said cylindrical flared part of said heat transfer pipe to form a pinched part disposed inwardly of a pipe end face of said cylindrical flared part, and a brazing filler material pooling part disposed between said pinched part and said pipe end face of said cylindrical flared part with said brazing filler material pooling part having an inner cross sectional area that is larger than that of said pinched part;
   inserting said capillary tube into said pipe end part of said heat transfer pipe so that said tube end part of said capillary tube extends within said pinched part; and
   performing a brazing process that brazes said capillary tube to said heat transfer pipe by flowing brazing filler material into said brazing filler material pooling part.

2. The method as recited in claim 1, wherein
   said flaring fabrication process includes forming an auxiliary flared part having a pipe diameter larger than that of said cylindrical flared part on a pipe end face side of said cylindrical flared part.

3. The method as recited in claim 1, wherein
   said cylindrical flared part formed in said flaring fabrication process has a length of at least 5 mm and less than 10 mm in a pipe longitudinal direction, and
   said pinched part formed in said flat crushing process has a length of in the pipe longitudinal direction of at least 0.4 times and less than 0.6 times that of said cylindrical flared part in the pipe longitudinal direction.

4. The method as recited in claim 2, wherein
   said cylindrical flared part formed in said flaring fabrication process has a length of at least 5 mm and less than 10 mm in a pipe longitudinal direction, and
   said pinched part formed in said flat crushing process has a length of in the pipe longitudinal direction of at least 0.4 times and less than 0.6 times the length of said cylindrical flared part in the pipe longitudinal direction.

5. A flat crushing jig comprising:
   a pin member including a first columnar part configured and arranged to be disposed in a pipe longitudinal direction within a cylindrical flared part of a heat transfer pipe and has a diameter greater than or substantially equal to a tube end part of a capillary tube to be inserted into said heat transfer pipe, and a second columnar part disposed on a pipe end face of said first columnar part and having a diameter larger than that of said first columnar part; and
   a pair of grabbing members configured and arranged to be moved inwardly towards opposite sides of said second columnar part and further being configured to flatly crush said cylindrical flared part in a pipe latitudinal direction to form a pinched part along only a part of said cylindrical flared part that corresponds to said first columnar part of said pin member.

6. A connection structure comprising:
   a heat transfer pipe including a pipe end part with a cylindrical flared part having a brazing filler material pooling part adjacent a pipe end face of the cylindrical flared part and a pinched part disposed on an opposite side of said brazing filler material pooling part from the pipe end face of the cylindrical flared part; and
   a capillary tube having a tube end part with a diameter smaller than that of said pipe end part of said heat transfer pipe, said capillary tube being disposed within the pinched part of said heat transfer pipe; and a brazing filler material disposed within the brazing filler material pooling part that secures said capillary tube to said heat transfer pipe, said pinched part and said brazing filler material pooling part being formed by flatly crushing in a pipe latitudinal direction only a portion of said cylindrical flared part that is spaced from said pipe end face.

7. The connection structure as recited in claim 6, wherein said heat transfer pipe further includes an auxiliary flared part that encloses a perimeter of said brazing filler material pooling part, said auxiliary flared part being formed on a pipe end face side of said brazing filler material pooling part.

8. The connection structure as recited in claim 6, wherein said cylindrical flared part has a length in a pipe longitudinal direction of at least 5 mm and less than 10 mm, and said pinched part has a length in the pipe longitudinal direction of at least 0.4 times and less than 0.6 times the length of said cylindrical flared part in the pipe longitudinal direction.

9. A heat exchanger having a plurality of said connection structures as recited in claim 6, and further comprising:

a plurality of plate fins arranged in parallel at a prescribed interval, with a plurality of said heat transfer pipes passing through said plurality of plate fins in a plate thickness direction.

10. The connection structure as recited in claim 7, wherein said cylindrical flared part has a length in a pipe longitudinal direction of at least 5 mm and less than 10 mm, and said pinched part has a length in the pipe longitudinal direction of at least 0.4 times and less than 0.6 times the length of said cylindrical flared part in the pipe longitudinal direction.

11. The heat exchanger as recited in claim 9, wherein each of the heat transfer pipes includes an auxiliary flared part that encloses a perimeter of said brazing filler material pooling part, the auxiliary flared part being formed on a pipe end face side of said brazing filler material pooling part.

12. The heat exchanger as recited in claim 9, wherein said cylindrical flared part has a length in a pipe longitudinal direction of at least 5 mm and less than 10 mm, and said pinched part has a length in the pipe longitudinal direction of at least 0.4 times and less than 0.6 times the length of said cylindrical flared part in the pipe longitudinal direction.

13. The heat exchanger as recited in claim 11, wherein said cylindrical flared part has a length in a pipe longitudinal direction of at least 5 mm and less than 10 mm, and said pinched part has a length in the pipe longitudinal direction of at least 0.4 times and less than 0.6 times the length of said cylindrical flared part in the pipe longitudinal direction.

* * * * *